United States Patent [19]
Nerin et al.

[11] Patent Number: 6,047,012
[45] Date of Patent: Apr. 4, 2000

[54] MICROLASER WITH MODULATED EMISSION FREQUENCY

[75] Inventors: Philippe Nerin, Nages et Solorgues; Jean-Yves Robic, Grenoble; Jean Marty, Seyssins, all of France

[73] Assignee: Commissariat a l'Energie Atomique, France

[21] Appl. No.: 08/986,747

[22] Filed: Dec. 8, 1997

[30] Foreign Application Priority Data

Dec. 16, 1996 [FR] France .................. 96 15433

[51] Int. Cl.⁷ .................. H01S 3/10
[52] U.S. Cl. .................. 372/32; 372/34; 372/36; 372/49; 372/92
[58] Field of Search .................. 372/49, 34, 36, 372/29, 32, 92

[56] References Cited

U.S. PATENT DOCUMENTS

| | | | |
|---|---|---|---|
| 5,265,116 | 11/1993 | Mooradian | 372/92 |
| 5,481,122 | 1/1996 | Jou et al. | 372/49 |
| 5,960,014 | 9/1999 | Li et al. | 372/34 |
| 5,960,021 | 9/1999 | De Vrieze et al. | 372/49 |

FOREIGN PATENT DOCUMENTS

| | | |
|---|---|---|
| 0571051 | 11/1993 | European Pat. Off. . |
| 42 44 689 | 1/1994 | Germany . |

OTHER PUBLICATIONS

J.J. Zayhowski and J.A. Keszenheimer, "Frequency Tuning of Microchip Lasers Using Pump–Power Modulation", pp. 1118–1122, IEEE (1992). (No Month).

J.J. Zayhowski, P.A. Schulz, C. Dill III, and S.R. Henion, "Diode–Pumped Composite–Cavity Electrooptically Tuned Microchip Laser", IEEE (1993). (No month).

J.J. Zayhowski, "Microchip Lasers", pp. 427–446, (No Date).

Primary Examiner—James W. Davie
Attorney, Agent, or Firm—Burns, Doane, Swecker & Mathis LLP

[57] ABSTRACT

A microlaser cavity is provided with a solid active medium (2), an entry mirror (4), an exit mirror (60) and a layer of electrically resistive material formed on one of the surfaces of the microcavity. The electrically resistive layer has optical transparency and reflectivity properties adapted to the surface of the microcavity on which the layer is deposited.

13 Claims, 4 Drawing Sheets

MICROLASER WITH MODULATED EMISSION FREQUENCY

DESCRIPTION

Technical Field

This invention relates to the solid microlasers domain.

A microlaser has a structure that consists of a stack of multi-layers. The laser active medium is composed of a thin layer of material (for example between 150 and 1000 μm) with small dimensions (cross-section of the order of a few mm$^2$), on which dielectric mirrors are directly deposited. This active medium may be pumped by a laser diode III-V which is either directly hybridized on the microlaser, or is coupled to it by optical fiber.

There are many applications of microlasers in a wide variety of fields such as the automobile industry, environment, scientific instrumentation or telemetry.

If the length of the Fabry-Pérot cavity in the microlaser is sufficiently short, a single laser emission beam may be obtained, while the transverse structure of the beam is similar to the theoretical TEM$_{00}$ mode (the beam is circular and gaussian).

Microlasers with modulated emission frequency are used in applications for the chemical analysis of gaseous constituents, analysis of speed fields, contact free metrology, laser imagery, and medical instrumentation.

A variety of techniques for matching or modulating the laser emission wavelength are known.

According to a first technique, for example described in the article by J. J. Zayhowski and entitled "Microchip Lasers" published in The Lincoln Laboratory Journal vol. 3, No. 3, page 427 and subsequent pages, 1990, a piezoelectric element applies a transverse force onto the microlaser structure which modulates the optical frequency by a few MHz for a modulation recurrence varying from continuous to 40 ns. This type of structure is not suitable for collective production of a microlaser. The result is a high manufacturing cost. Furthermore, there is no guarantee that the performances can be repeated between two microlasers.

Furthermore, this structure is itself complex: it requires a combination of the active laser medium and an element with piezoelectric properties.

Another technique consists of inserting an electro-optic element in the microlaser cavity: for example, this type of technique is described in the article by J. J. Zayhowski et al. entitled: "Diode pumped composite cavity electro-optically tuned microchip Laser" published in IEEE Photonics Technology Letters, vol.-5, No. 10, pp. 1153, October 1993. The structure described in this document requires that an electro-optic material be glued on the laser active medium. Electrodes are placed facing each other along the direction of the crystallographic axis C of the electro-optic medium. An optical frequency excursion of 30 GHz was observed by applying a voltage varying from −1000 V to +1000 V on the electro-optic crystal. This type of device is difficult to use. In particular, the control voltage of the electro-optic element adds a degree of complexity into the architecture of the component. It is difficult to make all elements cohabit, due to electromagnetic compatibility problems. Finally, the large value of the voltage variation necessary for the device to operate requires sophisticated electronics, which are incompatible with the simplicity and low cost of microlaser production.

Other techniques have been proposed to obtain a frequency modulation. For example, an optical frequency modulation may be obtained by modulating the power of the pumping beam: this technique is described in the article by J. J. Zayhowski et al. entitled "Frequency tuning of microchip lasers using pump-power modulation" published in IEEE J. Of Quantum Electronics, vol. 28, No. 4, p. 1118, April 1992. The main disadvantage of this modulation process is due to the fact that an amplitude modulation accompanies the frequency modulation. This amplitude modulation is undesirable in most applications. Furthermore, the frequency scanning amplitude is low since it is limited by the variation of the temperature of the amplifier crystal created by variations of the pump-power.

DISCLOSURE OF THE INVENTION

The purpose of the invention is a microlaser structure comprising frequency modulation means, and with a simpler structure than known structures. Furthermore, the structure of the microlaser according to the invention has a high modulation efficiency, and is compatible with collective production criteria.

More precisely, the purpose of the invention is a microlaser cavity comprising:

a solid active medium, an entry mirror, an exit mirror, a layer of resistive material being formed on one of the surfaces of the microcavity.

This layer of resistive material has optical transparency and reflectivity properties adapted to the surface of the microcavity on which it is deposited.

The layer of resistive material can be used to make a heating layer, which expands the laser material by thermal conduction and modifies its refraction index. The variation in the optical path of the Fabry-Pérot cavity changes the laser emission frequency. This effect is used to modulate the emission frequency.

Therefore in the device according to the invention, the thermo-optical properties of the laser medium are used to generate a frequency modulation. Compared with modulation using a pumping beam, it is possible to generate large temperature variations in the laser crystal, by modifying the current injected in the resistive layer, without significantly varying the amplitude or emission power of the beam emitted by the laser beam.

This structure can give very high modulation efficiencies. Furthermore, it is compatible with a collective production process: particularly, the mirrors and the heating element (resistive) may be deposited collectively in thin layers.

The type of resistive material may be ITO (Indium Tin Oxide), or indium oxide, or tin oxide doped with antimony or fluorine, or zinc oxide doped with aluminum, or gallium, or indium. In general, metallic oxides are appropriate for this use.

The resistive layer may be deposited between one of the two mirrors and the active laser medium: this means that optimum thermal coupling is possible with the laser medium.

Preferably, metallic electrodes are deposited laterally on the resistive layer: this can give uniform heating of the heating surface.

In order to improve the modulation efficiency, means may be provided to facilitate extraction of heat generated in the active medium by the layer of resistive material when a current passes through it.

These means may comprise an element that may be thermostat controlled, located in contact with the surface of the microlaser which is opposite the surface on which the layer of resistive material is formed, or in contact with one (or several) lateral surface(s) of the microlaser.

Means may also be provided to stabilize the laser emission frequency under the effect of temperature variations, if any.

BRIEF DESCRIPTION OF THE FIGURES

In any case, the characteristics and advantages of the invention will become evident in reading the following description. This description relates to production examples given for explanation only and are in no way limitative, referring to the attached drawings, on which.

DETAILED DESCRIPTION OF EMBODIMENTS OF THE INVENTION

In the various embodiments of the invention, the material forming the active laser medium may be doped with neodyme (Nd) for a laser emission around 1.06 μm. For example, this material may be chosen from one of the following materials: YAG ($Y_3Al_5O_{12}$), LMA ($LaMgAl_{11}O_{19}$), $YVO_4$, YSO ($Y_2SiO_5$), YLF ($YLiF_4$) or $GdVO_4$, etc.

Different materials and doping agents will be chosen for emissions at other wavelengths. In general, active ions are chosen from among:

Nd for an emission around 1.06 μm,

Er or erbium-ytterbium Er+Yb co-doping for an emission around 1.5 m,

Tm or Ho or co-doping of thulium and holmium for an emission around 2 μm.

Furthermore, the thickness $e$ of the active medium depends on some characteristics of the microlaser:

firstly, absorption of the pump beam becomes stronger as the thickness e increases; if $I_o$ is the current of the incident pump on the input surface, and "a" is the absorption coefficient, the current absorbed on the thickness $e$ will be given by:

$$I\ absorbed = I_o(l-e^{-ae}),$$

secondly, the number of longitudinal modes of a Fabry-Pérot cavity increases with the thickness, and this thickness should preferably be kept low if it is required to make a single mode longitudinal laser. In a Fabry-Pérot plane-plane cavity with a thickness equal to e, the free spectrum interval dv between two Fabry-Pérot modes is given by:

$$dv = C/2e$$

where c=speed of light.

If dg is the width of the gain band (of laser emission) of the material, the number of modes N will be given by:

$$N = dg/dv$$

It can be seen that for a given material (given a and dg), the absorption of the pump increases when e increases, but N also increases. For a single frequency laser, the minimum thickness for N=1 is usually chosen. Typical thicknesses to obtain a single mode are:

YAG L=750 μm, $YVO_4$ L=500 μm,

LMAL L=150 μm.

Therefore in practice, $e$ varies for example between 100 μm and 1 mm.

Figure 1:
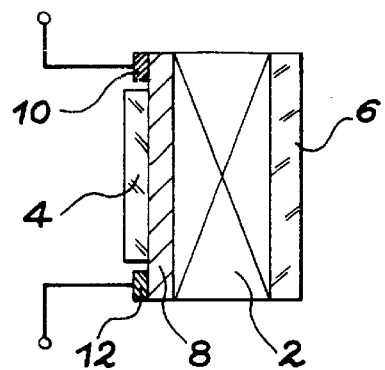
FIG. 1 shows a first embodiment of the invention.

FIG. 1 shows a first embodiment of the invention. Reference 2 shows the active medium of the microlaser. This medium is between two mirrors 4 and 6 that close the microlaser cavity (Fabry-Pérot cavity).

A layer 8 of resistive material is deposited directly on the amplifying medium: the direct contact between the resistive layer and the amplifying medium give optimum thermal coupling. Metallic contact electrodes 10, 12 are deposited on this resistive layer. If these electrodes are deposited laterally, then uniform heating of the heating surface is guaranteed. A set of dielectric layers is then deposited on the resistive layer 8 to form the mirror 4.

The material making up layer 8 is a conducting material with optical properties adapted to the surface of the microlaser on which it is deposited. Thus, if layer 8 is deposited on the side of the microlaser through which the pumping beam enters, this layer will be transparent, i.e. will have a certain degree of transparency, to the pumping beam. Furthermore, it may be transparent to the laser wavelength. If it is deposited on the other side, this layer will be transparent, i.e. will have a certain degree of transparency at least at the laser emission wavelength.

Most materials capable of satisfying these conditions are oxides, the most frequently used are indium oxide, indium tin oxide (ITO), tin oxide doped with antimony or fluorine, zinc oxide doped with aluminum, or gallium, or indium. Resistances of several hundred ohms are possible for ITO. Thus for relatively low currents (a few milliamperes), it is possible to generate thermal powers of several hundred milliwatts on one surface of the microlaser. With these relatively high thermal powers, it is fairly easy to obtain frequency modulation of the microlaser.

For example, the resistivity of ITO is typically between $5.10^{-4}$ and $2.10^{-3}$ Ω.m. Let $R_0$ be the ratio of the resistivity to the thickness of the layer, then the range of variation of $R_0$ is from 50 to 400Ω per square mm. Under these conditions, the optical losses are equal to 2% at 1064 nm (and 1% at 800 nm). For $\rho = 5.10^{-4}$ Ω.cm and for a layer thickness of 50 nm, $R_0 = 100Ω$. If the wavelength is equal to the width (e.g. 1×1 mm² microlaser chips), then the resistance of the layer is equal to 100Ω. If the power supply is under 10 Volts, then the power released is 1 Watt.

An increase in the temperature of the active medium by a few degrees usually gives a variation of a few GHz in the laser emission frequency. The precise value of the Δv/ΔT ratio (frequency variation/temperature variation) depends on the dimensions of the resonator and the amplifier material. Thus for an Nd:YAG or an Nd:YVO$_4$ microlaser (with a cavity wave length 500 µm) then $\Delta v/\Delta T \cong 3$ GHz/°C. If a current I is passed through the resistive layer 8, a temperature rise occurs on the surface of the microlaser due to the Joule effect, increasing the temperature of the mirror. Since the thermal diffusivity in laser materials is usually good, the temperature of the active material is correspondingly increased. Therefore, the laser frequency may be dynamically modified by varying the average temperature of the laser crystal. For example, the mirror can be kept at temperature $T_1$ (for example mirror 6 in FIG. 1) and the temperature in the second (mirror 4 on FIG. 1) may be varied in accordance with the following formula:

$$T_2(t) = T_2 + \Delta T \cos(2\pi f_m t) \tag{1}$$

Figure 5:
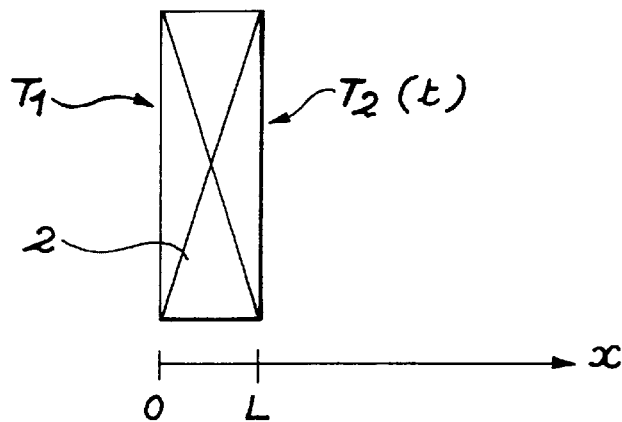
FIG. 5 is a schematic representation for modeling a thermally modulated microlaser.

The response of a laser crystal to a thermal modulation of this type can be modeled. This model will be explained with reference to FIG. 5. In this Figure the abscissa of each element is marked on an Ox axis approximately parallel to the axis of the microlaser cavity. The surface kept at temperature $T_1$ is located at X=0 on the abscissa, whereas the modulation $T_2(t)$ given above is applied to the surface at x=L on the abscissa. The temperature T(x,t) inside the active laser medium 2, at a point x on the abscissa and at time t, is given by the heat equation and the following boundary conditions:

$$\begin{cases} \dfrac{\partial 2T}{\partial T} = \dfrac{1}{a2}\dfrac{\partial T}{\partial t} \\ T(x=0; t) = T_1 \\ T(x=L; t) = T_2 + \Delta T \cos(2\pi f t) \end{cases} \tag{2}$$

The superposition principle is used to solve this problem at the boundaries. The problem is broken down into three sub-problems:
- a first sub-problem, in which one of the surfaces is kept at temperature $T_1$, and the other surface at temperature 0,
- a second sub-problem in which one of the surfaces is kept at temperature 0 and the other surface at temperature $T_2$,
- a third sub-problem in which one of the surfaces is kept at temperature 0 and the other surface is modulated by $\Delta T \cos(2\pi ft)$.

There is a group of equations for each of these sub-problems. Therefore, the solution of (2) can be found by solving (P1), (P2), (P3):

$$\begin{cases} \dfrac{\partial 2T_1}{\partial x2} = \dfrac{1}{a2}\dfrac{\partial T_1}{\partial T} \\ T1(x=0; t) = T1 \\ T1(x=L; t) = 0 \end{cases} \tag{P1}$$

$$\begin{cases} \dfrac{\partial 2T2}{\partial x2} = \dfrac{1}{a2}\dfrac{\partial T2}{\partial t} \\ T2(x=0; t) = 0 \\ T2(x=L; t) = T2 \end{cases} \tag{P2}$$

$$\begin{cases} \dfrac{\partial 2T3}{\partial x2} = \dfrac{1}{a2}\dfrac{\partial T3}{\partial t} \\ T3(x=0; t) = 0 \\ T3(x=L; t) = \Delta T \cos(2\pi ft) \end{cases} \tag{P3}$$

Check that the problem solution is written:

$$T(x,t) = T_1(x,t) + T_2(x,t) + T_3(x,t)$$

where the three elementary solutions are written:

$$T_1(x,t) = T_1(1 - x/L)$$

$$T_2(x,t) = T_2 x/L$$

$$T_3(x,t) = \Delta T \cdot \mathrm{Re}\left[\frac{\sin\left(\dfrac{x}{a}\sqrt{i\omega}\right)}{\sin\left(\dfrac{L}{a}\sqrt{i\omega}\right)} e^{-\overline{\omega}t}\right]$$

The average temperature of the crystal can be calculated:

$$T(\omega, t) = \frac{1}{rmL}\int_0^L T(x,t) \cdot rm \cdot dx =$$

$$\frac{T1+T2}{2} + \frac{\Delta T}{2}\mathrm{Re}\left[2 \cdot \frac{1 - \cos\left(\dfrac{L}{a}\sqrt{i\omega}\right)}{\dfrac{L}{a} \cdot \sqrt{i\omega} \cdot \sin\left(\dfrac{L}{a}\sqrt{i\omega}\right)} \cdot \mathrm{Exp}(-i\omega t)\right]$$

that can be written in condensed form:

$$T(\omega, t) = T0 + \frac{\Delta T}{2} R(\omega)\cos[\omega \cdot t + \phi(\omega)],$$

using the following notations:

$$* T0 = \frac{T1+T2}{2}$$

$$* a^2 = \frac{K}{\rho C}$$

where K is the thermal conductivity of the laser medium 2, $\rho$ is its density and C its specific heat.

$$* R(\omega) = \mathrm{Module}\left[2\frac{1-\cos\left(\dfrac{L}{a}\sqrt{i\omega}\right)}{\left(\dfrac{L}{a}\right)\sqrt{i\omega} \cdot \sin\left(\dfrac{L}{a}\sqrt{i\omega}\right)}\right]$$

$$* \varphi(\omega) = \mathrm{Arg}\left[2\frac{1-\cos\left(\dfrac{L}{a}\sqrt{i\omega}\right)}{\left(\dfrac{L}{a}\right)\sqrt{i\omega} \cdot \sin\left(\dfrac{L}{a}\sqrt{i\omega}\right)}\right]$$

Figure 6A:
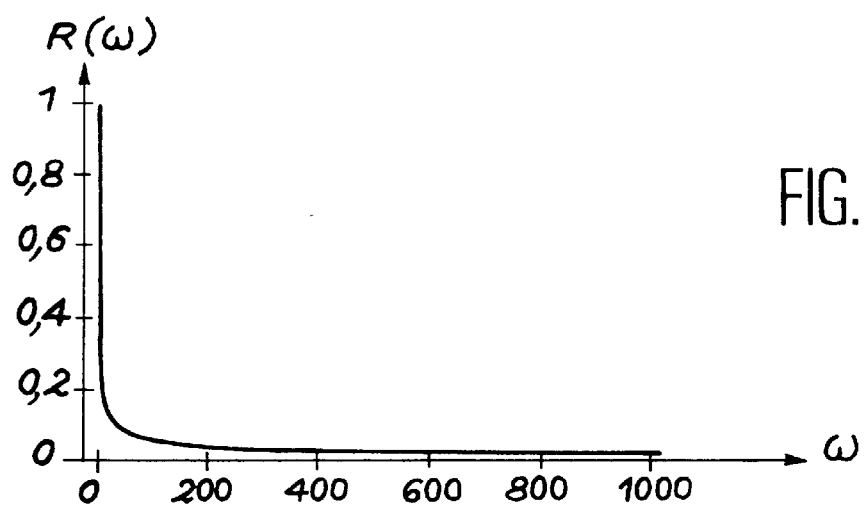
FIGS. 6A and 6B show how the amplitude and phase of the temperature modulation of the amplifier medium vary with frequency, for a microlaser according to the invention.
Figure 6B:
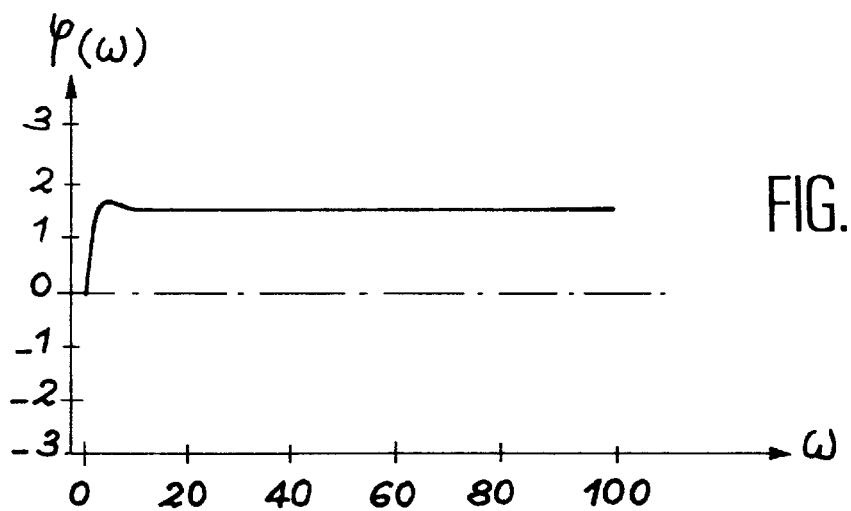

FIGS. 6A and 6B show the variations of $R(\omega)$ and $\phi(\omega)$ as a function of $\omega/2\pi$ for a YAG:Nd laser crystal with L=500 µm. Let $$\omega 0 = \left(\frac{a}{L}\right)^2$$

be the cutting pseudo-frequency, then the following asymptotic behaviors can be found:

$$R(\omega \ll \omega_0) = 1$$

$$\phi(\omega \ll \omega_0) = 0$$

$R(\omega>>\omega_0)<<1$ $\phi(\omega>>\omega_0)=\pi/2$

Therefore, for $\omega<<\omega_0$, the average increase in the temperature of the active medium 2 is equal to the increase $\Delta T$ in the temperature of the heating mirror. Furthermore, the average temperature of the crystal is in phase with the excitation.

The behavior for $\omega>>\omega_0$ shows that the increases in the average temperature of the active medium 2 decreases quickly when $\omega$ exceeds $\omega_0$.

The laser emission frequency is written as follows:

$v(\omega,t)=v(T_0)+\Delta v(\Delta T, \omega,t)$

Only the term $\Delta v$ ($\Delta T$, $\omega$, t) is useful for frequency modulation applications, and can be written:

$$\Delta v(\Delta T, \omega, t) = -v0\left[\alpha e + \frac{1}{n}\frac{\partial n}{\partial T}\right] \cdot \frac{\Delta T}{2} R(\omega)\cos[\omega T + \varphi(W)]$$

At zero frequency $\omega=0$, the above formula gives $\Delta v/\Delta T=$ 3.2 GHz/°C.$^{-1}$, which agrees with experimental results. The function $R(\omega)$ decreases quickly, which means that a high temperature variation $\Delta T$ is necessary in order to create a significant modulation amplitude $\Delta v$ at high frequency. The invention solves this problem; depositing a thin layer of resistive material on a surface of the laser, and then passing a current through the resistive layer, creates the temperature variation $\Delta T$ necessary to easily modulate the laser emission frequency for modulation frequencies of the order of one kilohertz.

Figure 2:
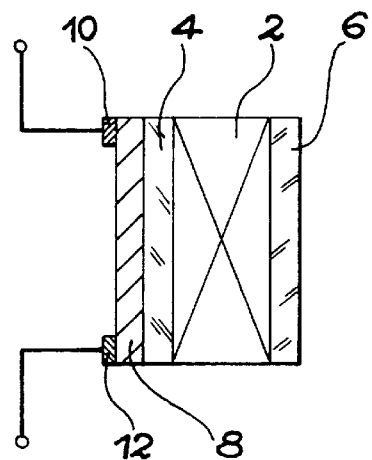
FIG. 2 shows a second embodiment of the invention.

In an another embodiment shown in FIG. 2, the resistive layer 8 is deposited on the mirror 4, for example on the side through which the active laser medium pumping beam enters. Here again, the optical properties of layer 8 will be adapted as a function of the surface on which it is deposited.

When layer 8 is deposited on material 2 directly (the case in FIG. 1), the thickness of layer 8 (for example for ITO, thickness equal to an integer multiple of $\lambda/4$), and its refraction index ($\approx 1.8$) affect the characteristics of the multi-layer mirror 4 and particularly its reflectivity, to obtain optimal operation of the microlaser.

When layer 8 is deposited on the multi-layer filter 4 (the case in FIG. 2), the thickness of layer 8 and its refraction index have little influence on operation of the filter since the first layers in contact with the laser material fix the spectral profile of the multi-layer filters 4 and 6. Under these conditions, the multi-layer formula, with or without layer 8, is approximately the same.

Figure 3:
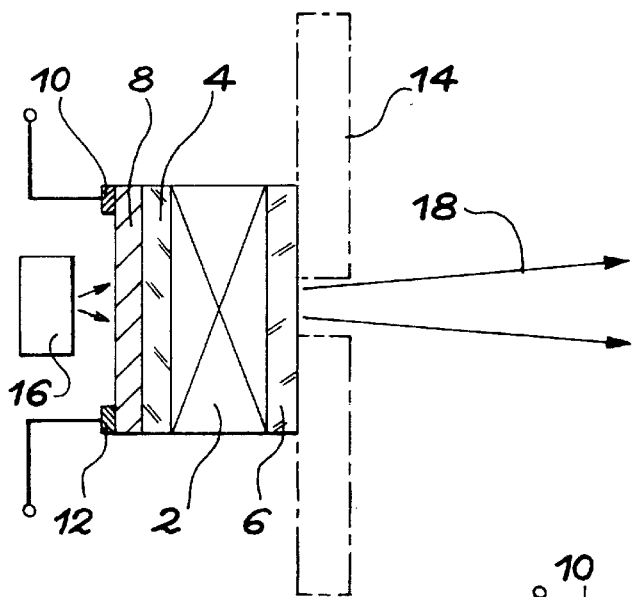
FIGS. 3 and 4 show two other embodiments of the invention with a thermostat controlled element.
Figure 4:
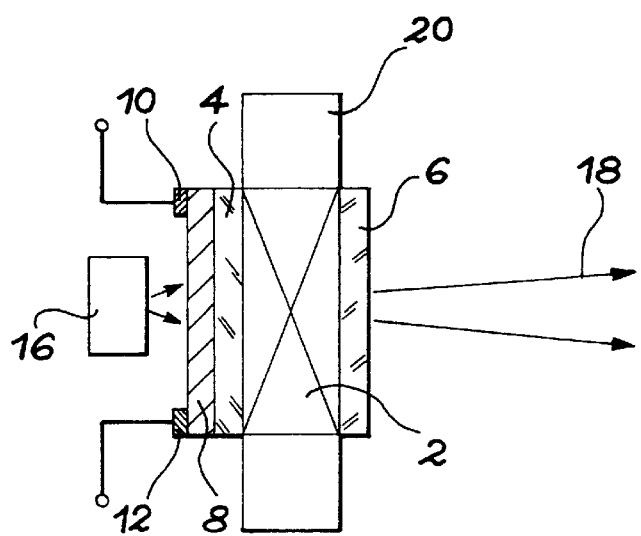

Two other embodiments are shown in FIGS. 3 and 4. In these Figures, numeric references equal to those in FIGS. 1 and 2 refer to similar or corresponding elements.

Furthermore, the device in FIG. 3 includes an element that can be thermostat controlled, for example at a constant temperature $T_1$. For example, this element can be a copper radiator or a Peltier effect element or any other thermal/thermoelectric exchanger.

This thermostat controlled element is capable of extracting heat generated in the microlaser due to the temperature increase when current passes through the resistive layer 8. Heat may also be extracted using the side surfaces of the microlaser; reference 20 in FIG. 4 refers to the thermostat controlled element.

References 16 and 18 in FIGS. 3 and 4 refer to a pumping diode in the active laser medium and a laser beam emitted by the microlaser, respectively.

Regardless of the embodiment considered, the device according to the invention can modulate the microlaser emission wavelength with a high modulation efficiency, of the order of a few GHz. Furthermore, the device produced is simple and compatible with a collective manufacturing method. The component obtained is robust since it is monolithic.

High modulation recurrences of the order of a few milliseconds may be obtained.

Finally, the manufacturing cost of this type of structure is low.

Figure 7:
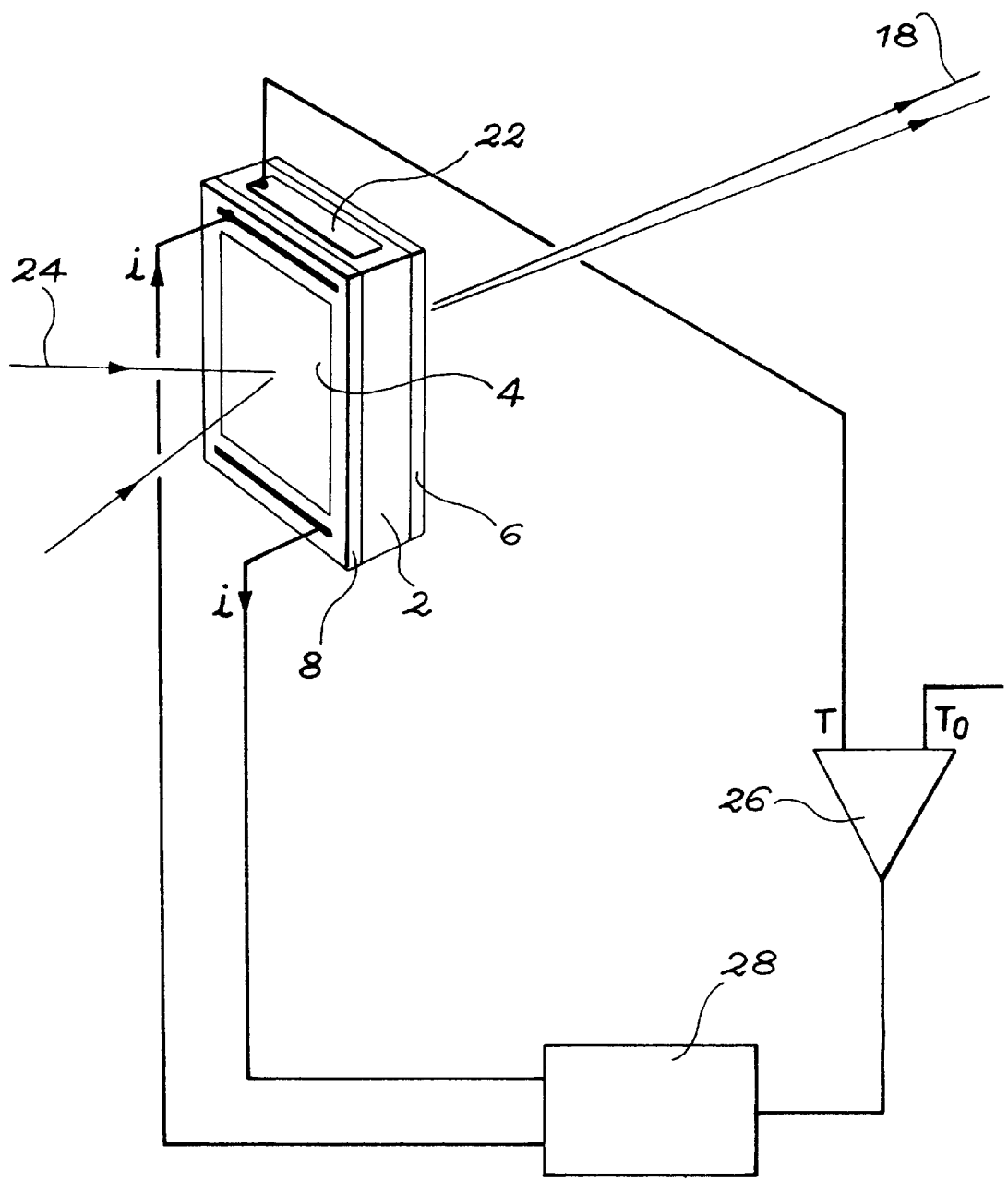
FIG. 7 shows a temperature stabilized microlaser.

Another possible application of this invention is the possibility of stabilizing the laser emission frequency with regard to thermal drift. In this case (as shown in FIG. 7), a temperature probe 22 (thermistance) and a servocontrol are added to the circuit. For example, the servocontrol system may include a comparator 26 and a controlled current generator 28. The comparator compares the value of the temperature T measured using thermistance 22 with a set value $T_0$, and outputs an error signal $\epsilon$:

if T<T0, the error signal $\epsilon$ is positive and the current i output by the generator increases following an equation of the type i=G(1-$\epsilon$)

if T<T0, the error signal $\epsilon$ is negative and the current i decreases; the temperature of the crystal drops by radiation or conduction if a heat sink or thermostat controlled element is added.

A process for making a laser according to the invention will now be described in relation to FIGS. 8A to 8D.

A first step (FIG. 8A) consists of choosing the active laser material, orienting it and cutting it into strips 30, for example with a thickness of between a few hundred micrometers and a few millimeters. These strips are then ground and polished.

The input and output mirror layers 32, 34 are then deposited. For example they may be dichroic mirrors obtained by a deposit of dielectric multilayers.

Figure 8A:
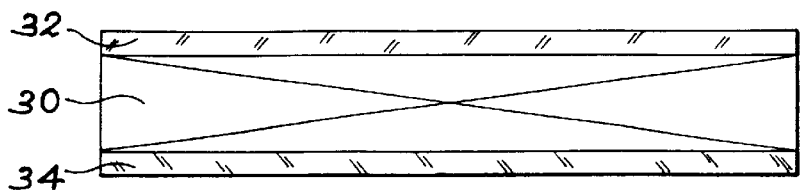
FIGS. 8A to 8D illustrate the steps in a process for making a device according to the invention.
Figure 8B:
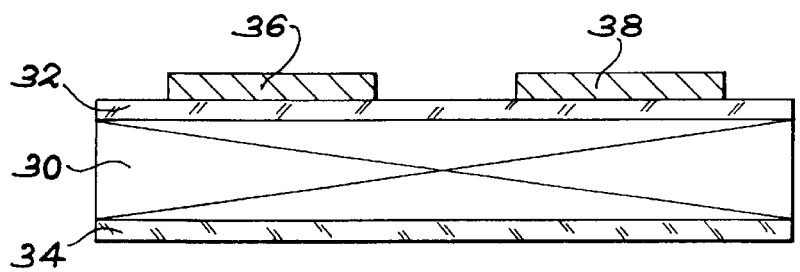
Figure 8C:
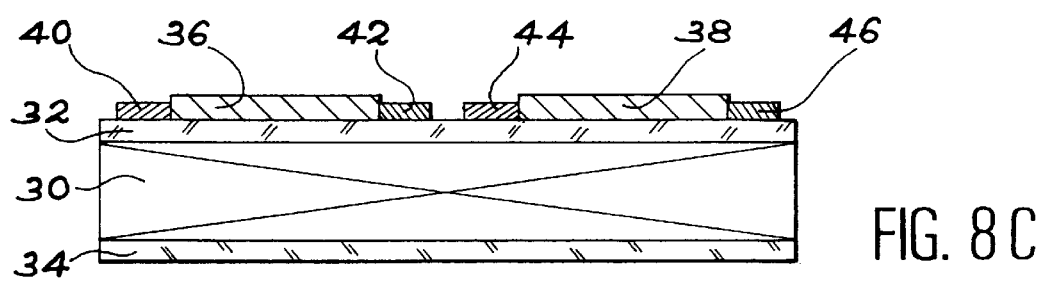
Figure 8D:
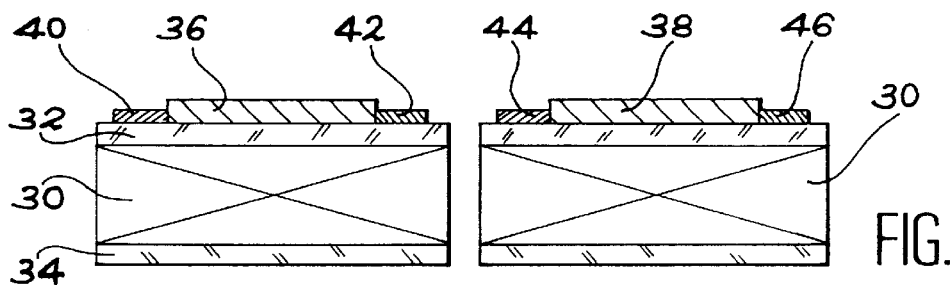

Then, for example, a layer of resistive material with adapted transparency properties may be deposited on layer 32 (FIG. 8B). For example, the deposit technique may be sputtering, or reactive evaporation or ion assisted deposition (IAD). This layer is then etched by mechanical masking and "lift-off" etching to form areas 36, 38 adapted to individual microlasers.

The third step is to make contact points 40, 42, 44 and 46 (FIG. 8C) for each resistive layer 36, 38.

The last step (FIG. 8D) cuts individual microlaser cavities. Each cavity then comprises an active laser medium, its input and output mirrors, a resistive layer and its contact studs.

The assembly may then be coupled to a pumping diode directly hybridized on the microlaser cavity or connected to it through an optical fiber.

We claim:

1. Microlaser cavity having a microcavity and comprising:

a solid active medium;

an entry mirror;

an exit mirror; and a layer of electrically resistive material being formed on one of the surfaces of the microcavity, said layer of electrically resistive material having optical transparency and/or reflectivity properties adapted to the surface of the microcavity on which said layer is deposited.

2. Microlaser cavity according to claim 1, the resistive material being ITO, or indium oxide, or tin oxide doped with antimony or fluorine, or zinc oxide doped with aluminium, or gallium or indium.

3. Microlaser cavity according to claim 1, the electrically resistive layer being deposited between one of the two mirrors and the active medium.

4. Microlaser cavity according to claim 1, further comprising a pair of metallic electrodes deposited laterally on the resistive layer.

5. Microlaser cavity according to claim 1, further comprising means for facilitating extraction of heat generated in the active medium by the layer of electrically resistive material when a current is passed therethrough.

6. Microlaser cavity according to claim 5, the means of extracting heat comprising an element that may be thermostat controlled, placed in contact with the surface of the microlaser opposite to the surface on which the layer of resistive material is formed, or in good contact with a side face of the microlaser.

7. Microlaser cavity according to claim 1, further comprising means for stabilizing laser emission frequency with regard to temperature variations.

8. Microlaser cavity according to claim 1, further comprising an active laser medium temperature sensor, and means for servocontrolling a current to be passed through the layer of electrically resistive material.

9. Microlaser cavity according to claim 2, the electrically resistive layer being deposited between one of the two mirrors and the active medium.

10. Microlaser cavity according to claim 2, further comprising a pair of metallic electrodes deposited laterally on the resistive layer.

11. Microlaser cavity according to claim 2, further comprising means for facilitating extraction of heat generated in the active medium by the layer of electrically resistive material when a current is passed therethrough.

12. Microlaser cavity according to claim 2, further comprising means for stabilizing laser emission frequency with regard to temperature variations.

13. Microlaser cavity according to claim 2, further comprising an active laser medium temperature sensor, and means for servocontrolling a current to be passed through the layer of electrically resistive material.

* * * * *